No. 735,678. PATENTED AUG. 4, 1903.
J. W. RUGER.
DOUGH MIXING AND KNEADING MACHINE.
APPLICATION FILED OCT. 25, 1902.
NO MODEL. 2 SHEETS—SHEET 1.
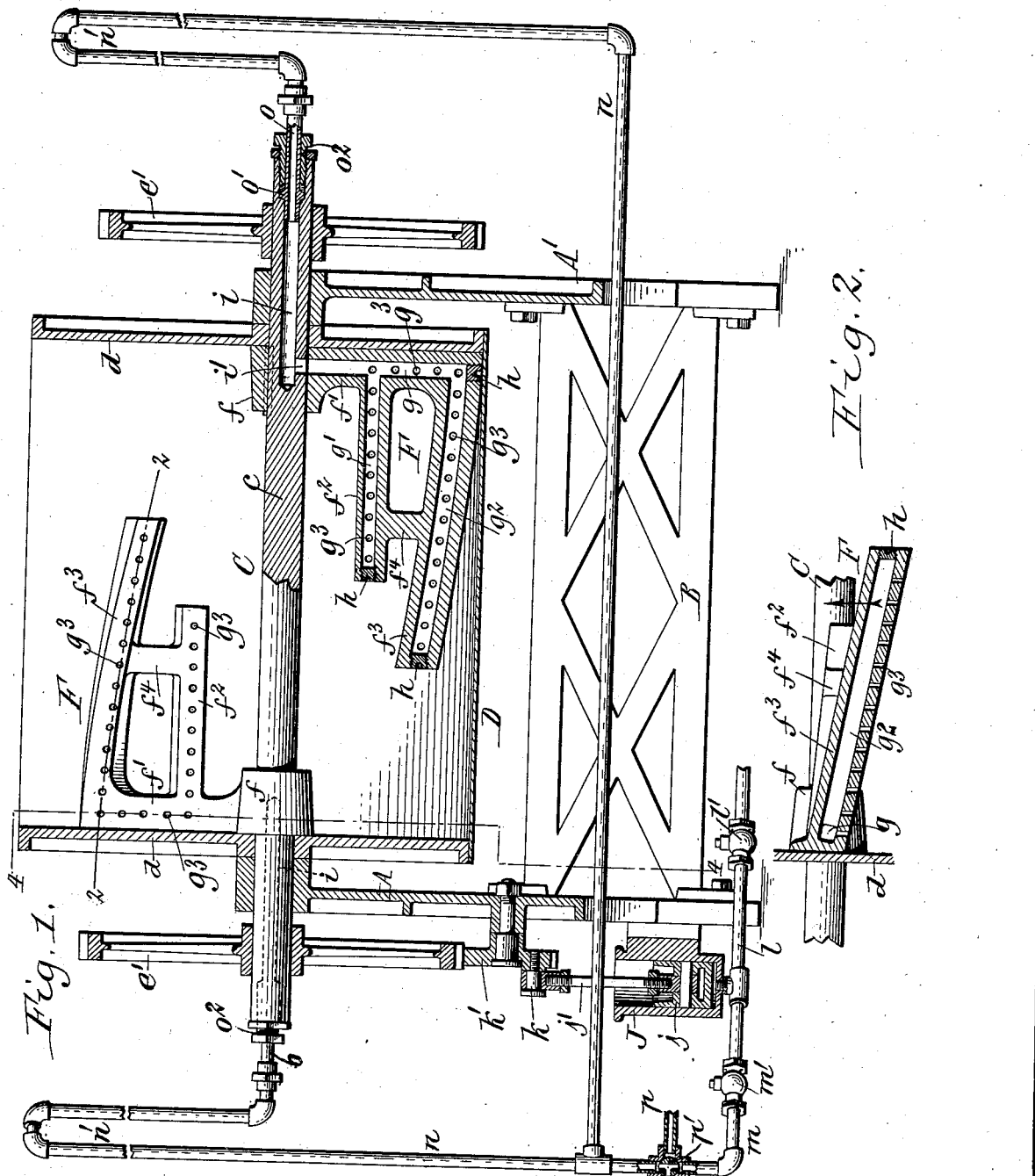

No. 735,678. PATENTED AUG. 4, 1903.
J. W. RUGER.
DOUGH MIXING AND KNEADING MACHINE.
APPLICATION FILED OCT. 25, 1902.
NO MODEL.
2 SHEETS—SHEET 2.
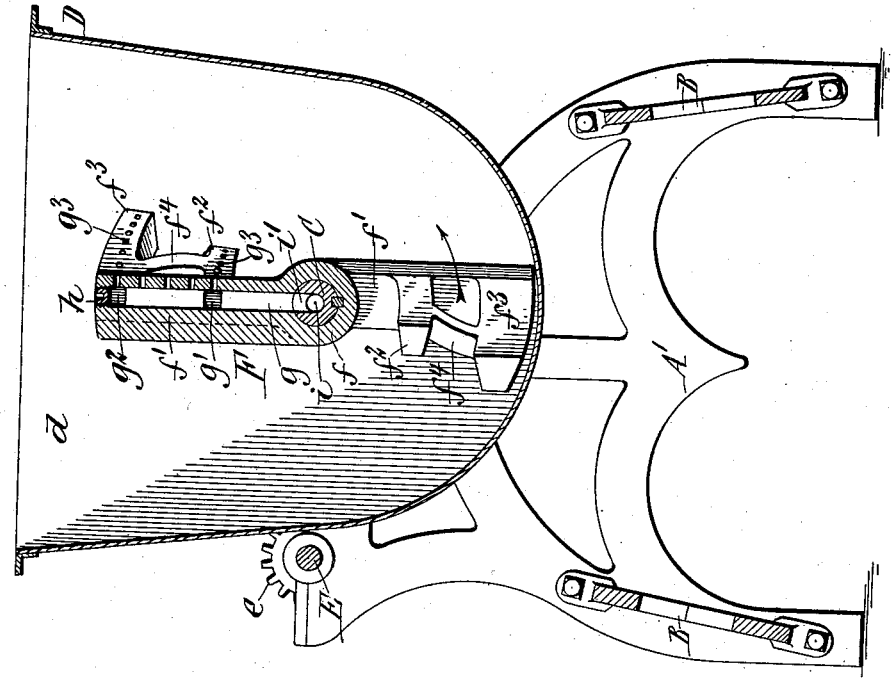
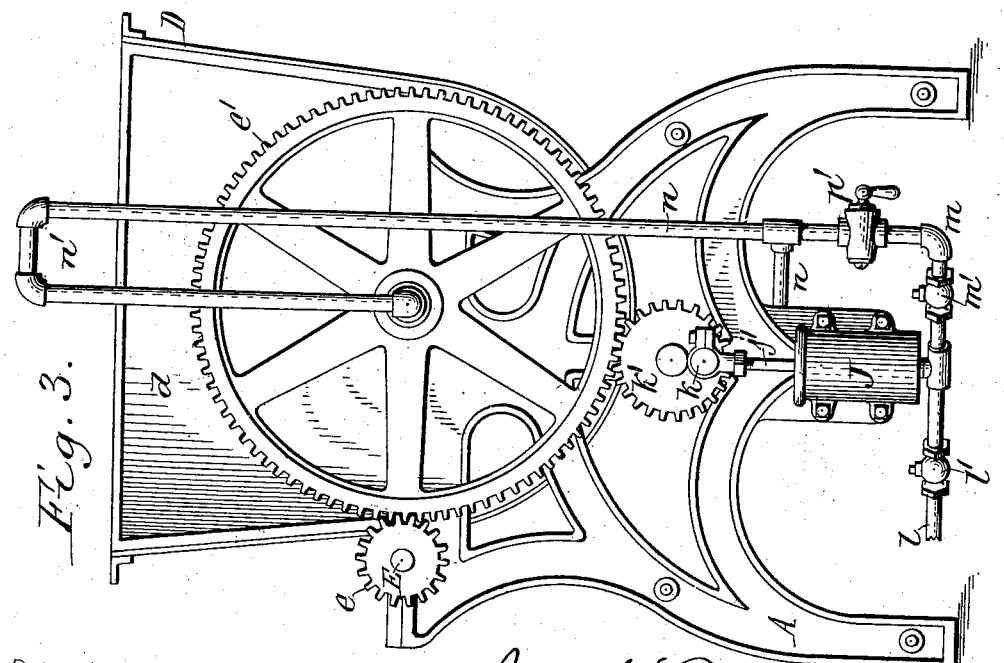

No. 735,678. Patented August 4, 1903.

UNITED STATES PATENT OFFICE.

JAMES W. RUGER, OF BUFFALO, NEW YORK, ASSIGNOR OF ONE-HALF TO THE J. W. RUGER MANUFACTURING COMPANY, OF BUFFALO, NEW YORK.

DOUGH MIXING AND KNEADING MACHINE.

SPECIFICATION forming part of Letters Patent No. 735,678, dated August 4, 1903.

Application filed October 25, 1902. Serial No. 128,785. (No model.)

*To all whom it may concern:*

Be it known that I, JAMES W. RUGER, a citizen of the United States, residing at Buffalo, in the county of Erie and State of New York, have invented new and useful Improvements in Dough Mixing and Kneading Machines, of which the following is a specification.

This invention relates to a machine for mixing and kneading dough, and has the objects to provide simple and efficient means for thoroughly aerating the dough and to improve the machine in other respects.

In the accompanying drawings, consisting of two sheets, Figure 1 is a longitudinal sectional elevation of a dough mixing and kneading machine embodying my improvements. Fig. 2 is a fragmentary longitudinal section through the trough and one of the beaters in line 2 2, Fig. 1. Fig. 3 is an end elevation of the machine. Fig. 4 is a vertical transverse section thereof in line 4 4, Fig. 1.

Similar letters of reference indicate corresponding parts throughout the several views.

The main frame of the machine may be of any suitable construction, but preferably consists of two transverse standards A A' and longitudinal side pieces B B, connecting the lower portions of the standards.

C represents the main or beater shaft, which is journaled horizontally in bearings on the upper ends of the standards.

D represents the trough in which the dough is mixed and which has an open top and a rounded or semicylindrical bottom. This trough is arranged between the standards and hung loosely on the beater-shaft. The latter extends lengthwise through the central part of the trough and through bearings in the end heads $d$ of the same, whereby the trough may be turned on the shaft for discharging its contents. The beater-shaft may be turned in any suitable manner, the means for this purpose shown in the drawings consisting of a driving-shaft E, journaled lengthwise on the standards in rear of the trough and provided with gear-pinions $e$, which mesh with gear-wheels $e'$ at opposite ends of the beater-shaft outside of the trough and standards.

Within the trough and at opposite ends thereof are two beaters F, whereby the dough contained in the trough is mixed and kneaded. Each of these beaters consists of a hub $f$, which is secured to the beater-shaft adjacent to one head of the trough, an arm $f'$, extending radially outward from one side of the hub, inner and outer longitudinal bars $f^2$ $f^3$, extending from the arm toward the opposite head of the trough, and a brace $f^4$, connecting said bars near their free or inner ends. Each of the beaters projects radially outward from one side only of the beater-shaft, leaving the space in the trough on the diametrically opposite side of the shaft unobstructed, and the free ends of the beater-bars terminate at a distance from the opposite head of the trough, so as to leave an intervening space between each beater and the opposite head of the trough on the same side of the shaft. By this construction and arrangement of the beaters the dough is not acted upon throughout the length of the trough on the same side of the shaft at one time, but the dough in opposite ends of the trough is acted upon alternately, whereby the tendency to carry the dough around in the trough without mixing or kneading the same is avoided. In order to further promote the mixing and kneading effect of these beaters, the bars are arranged obliquely with reference to the line of rotation, that end of the bars adjacent to the trough-head being arranged in advance of the inner or free ends, as shown in Fig. 2. This causes each beater to work the dough from that end of the trough in which it is located toward the opposite end of the trough, whereby the combined effect of both beaters works the dough alternately back and forth lengthwise of the trough and effects a thorough mixing and kneading of the same.

For the purpose of thoroughly aerating the dough at the same time that it is being mixed and kneaded an air-injecting device is provided, which is constructed as follows: As shown in the drawings, each beater is provided with a radial passage $g$ in its arm, longitudinal passages $g'$ $g^2$ in its inner and outer bars, and perforations or jet-openings $g^3$, extending from these passages through the back or trailing side of the beater. Air is supplied to the conduits in the beaters by any suitable air forcing or supplying means. Upon turning the beaters forwardly cavities are formed in the dough immediately in rear of its arms and bars, and into these cavities the air in the hollow beaters is delivered through the jet-openings thereof. This air is trapped in the dough as the latter closes upon the same during the continued forward movement of the beaters and becomes thoroughly mixed with the dough, thereby effectively hydrating the same and improving its quality. In order to permit of cleaning the air-supply passages in the beater, the same is provided at the outer ends of the passages with cleaning-openings, which are normally closed by screw-plugs $h$ or otherwise. When the interior of these passages becomes clogged by dough material which enters the same through the jet-openings, access may be had to these passages for cleaning the same by removing the plugs.

The air is supplied to the hollow beater-arms through passages or conduits $i\,i$, formed in the beater-shaft. As shown in Fig. 1, each of these conduits extends lengthwise through the shaft from the outer end thereof to a point within the hub of the beater and communicates at its inner end by a lateral branch passage $i'$ with the inner end of the passage $g$ in the adjacent beater-arm. The inner ends of the longitudinal air conduits or passages $i\,i$ on opposite ends of the beater-shaft are separated by the intervening solid or unbored portion $c$ of the shaft, thereby avoiding any unnecessary boring of the shaft and retaining it as strong as possible.

In order to obtain the maximum aeration of the dough, the air is supplied to the beaters under pressure, so that the air is forced into the dough and more thoroughly commingled with the same. For this purpose an air-pump is provided which draws the air from any suitable source of pure air and discharges the same into opposite ends of the main shaft. As shown in the drawings, the cylinder J of the pump is mounted on the lower part of the standard A and its plunger $j$ is connected by a pitman $j'$ with a crank-pin $k$ on a gear-pinion $k'$. The latter is journaled on the lower part of the adjacent standard and meshes with the gear-wheel $e'$ of the beater-shaft above the same. By thus mounting the pump on the main frame, which also carries the beater mechanism, and driving the pump-plunger from the beater-shaft the beaters and air-pump are always operated in unison, and these parts are inseparably connected, permitting the same to be readily transported without disorganizing the machine. The pump is preferably of the single-acting type, and the air is supplied to the working end of the same by a supply-pipe $l$, containing a check-valve $l'$. The air is discharged from the pump through a pipe $m$, which contains a check-valve $m'$ and which is connected by branch pipes $n\,n$ with opposite ends of the beater-shaft. In order to permit the beater-shaft to rotate without interfering with the pipes or conduits which supply the air to the same, each of the branch pipes is connected with one end of the beater-shaft by a rotary coupling. As shown in Fig. 1, this rotary coupling consists, essentially, of a horizontal section $o$ of the pipe $n$, which is arranged axially in the outer end of the shaft and provided with an external collar $o'$, bearing against a corresponding internal shoulder in the bore of the shaft, and a stuffing-box or packing-gland $o^2$, surrounding the outer part of said pipe-section and connected with the outer end of the shaft by a screw-joint, so that the same can be tightened against the collar $o'$ of the pipe-section $o$.

In order to prevent the dough mixture while in a liquid state in the trough from passing backwardly through the air-supply conduits into the pump and clogging the same, each of the branch air-supply pipes $n$ is provided with a loop $n'$, which extends at its highest point above the top of the trough, as shown in Fig. 3. Upon filling the trough with the liquid dough material the latter in passing backwardly through the air-supply conduits will rise in that leg of each loop which is connected with the shaft; but as the top of this loop is higher than the top of the trough the liquid cannot pass over into the other leg of the loop, thereby serving as a trap which prevents the liquid from reaching the pump.

When the dough mixture is first placed in the trough, a considerable part of the flour is still loose and unmoistened. If air is forced into the mixture while the same is in this condition, the loose flour would be blown out of the same, which is objectionable. In order to permit of operating the beaters and the air-pump in unison without forcing air into the dough until all the flour has been moistened, means are provided whereby the air discharged from the pump may be temporarily vented into the atmosphere instead of into the fresh dough mixture. For this purpose a waste-pipe or vent $p$ is connected with the air-conductor extending from the discharge of the pump to the conduits of the beaters and a three-way valve $p'$ is arranged to place the discharge of the pump in communication with the air-conductor leading to the hollow beaters or with the vent leading to the atmosphere.

Upon starting the machine after a fresh dough mixture has been placed in the trough the three-way valve is turned for cutting off the pump from the beaters and venting the same into the atmosphere. After the loose flour in the dough mixture has been thoroughly moistened the three-way valve is turned into the position shown in Fig. 1, in which the vent is closed and the air is directed from the pump into the dough. By this means for directing air from the pump into the dough or into the atmosphere the pump may be always operated in unison with the beaters, thereby avoiding uncoupling of the pump from its driving mechanism, which otherwise would be necessary.

I claim as my invention—

1. The combination of a trough, and a rotary beater arranged in said trough and consisting of a hub, a radial arm connecting with the hub, a plurality of longitudinal bars connecting at one end with the arm, and a brace connecting the opposite ends of the bars, substantially as set forth.

2. The combination of a trough, and a rotary beater arranged in said trough and consisting of a hub, a radial arm connecting with the hub, a plurality of longitudinal bars arranged obliquely to the line of rotation and connecting at one end with said arm, and a brace connecting the opposite ends of said bars, substantially as set forth.

3. The combination of a trough, and rotary beaters arranged in opposite ends of the trough and provided with air-delivery conduits, each of said beaters extending radially from one side only of its axis and in a direction opposite to the other beater leaving the space in the trough diametrically opposite each beater unobstructed, substantially as set forth.

4. The combination of a trough, a shaft extending through the trough and rotary beaters mounted obliquely on said shaft at opposite ends of the trough, each of said beaters having air-delivery conduits and extending radially from one side only of the shaft leaving the space in the trough diametrically opposite each beater unobstructed, substantially as set forth.

5. The combination of a trough, a hollow rotary beater arranged in the trough and provided with air-supply passages, and with air-delivery openings and cleaning-openings communicating with said passages, and plugs for closing said cleaning-openings, substantially as set forth.

6. The combination of a trough, a rotary beater arranged in the trough and consisting of a hub, a radial arm connecting with said hub, a plurality of longitudinal bars connecting at one end with said arm, said arm and bars having air-supply passages, air-delivery openings extending from the passages through the side of the arm and bars and cleaning-openings communicating with the outer ends of said passages, and screw-plugs for closing said cleaning-openings, substantially as set forth.

7. The combination of a trough, a shaft extending through the trough and provided with air-supply passages extending from opposite ends of the same into the trough and separated from each other by the solid intervening part of the shaft, and rotary beaters mounted on the shaft at opposite ends of the trough and having air-delivery conduits which communicate with the supply-passages of the shaft, substantially as set forth.

8. The combination of a trough, a beater arranged in said trough and provided with an air-delivery conduit, an air-forcing device, and means for connecting the discharge of the air-forcing device with said delivery-conduit or venting the same, substantially as set forth.

9. The combination of a trough, a beater arranged in the trough and provided with an air-delivery conduit, an air-pump, driving mechanism connecting said beater and air-pump for operating the same in unison, an air-conductor communicating with said delivery-conduit and provided with a vent opening into the atmosphere, and a valve for connecting the discharge of said pump with said conductor or with said vent, substantially as set forth.

10. The combination of a main frame, a hollow shaft journaled in the frame, a beater mounted on the shaft within the trough and provided with air-delivery conduits which communicate with the bore of the shaft, an air-pump having its cylinder mounted on said frame and its discharge connected with said hollow shaft, and a gear-pinion which is mounted on said frame and has a crank-pin connecting with the plunger of said pump, and a gear-wheel mounted on said shaft and meshing with said gear-pinion, substantially as set forth.

11. The combination of a main frame, a trough, a shaft extending through said trough and journaled on said frame and provided with an air-conduit, a beater mounted on said shaft and having an air-delivery conduit which communicates with the conduit of the shaft, an air-pump arranged on the frame below the trough and shaft, and an air-delivery pipe connecting the outlet of said pump with the conduit in said shaft and having a loop which extends above the top of said trough, substantially as set forth.

12. The combination of a main frame, a shaft journaled in said frame and having hollow ends, a trough mounted on said shaft, rotary beaters mounted on the shaft within the trough and each having air-delivery conduits which communicate with the bore in the respective end of the shaft, an air-pump mounted on the frame below the top of the trough, gearing connecting said shaft with the plunger of the pump, and air-conductor pipes each of which contains a loop extending above the top of said trough and connects at one end with the discharge of said pump while its opposite end connects by a rotary coupling with one of the hollow ends of the shaft, substantially as set forth.

Witness my hand this 26th day of September, 1902.

JAMES W. RUGER.

Witnesses:
THEO. L. POPP,
EMMA M. GRAHAM.